United States Patent
Berstis

(10) Patent No.: US 6,564,005 B1
(45) Date of Patent: May 13, 2003

(54) MULTI-USER VIDEO HARD DISK RECORDER

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,247

(22) Filed: Jan. 28, 1999

(51) Int. Cl.⁷ .................................................. H04N 5/91
(52) U.S. Cl. ........................................... 386/83; 386/95
(58) Field of Search ............................ 386/46, 83, 95, 386/111, 112, 125, 94; 345/327

(56) References Cited

U.S. PATENT DOCUMENTS

| | | | |
|---|---|---|---|
| 5,479,266 A | * 12/1995 | Young et al. | .................. 386/83 |
| 5,508,942 A | 4/1996 | Agarwal | |
| 5,521,630 A | 5/1996 | Chen et al. | |
| 5,521,898 A | 5/1996 | Ogasawara | |
| 5,623,690 A | 4/1997 | Palmer et al. | |
| 5,758,092 A | 5/1998 | Agarwal | |
| 5,809,239 A | 9/1998 | Dan et al. | |
| 5,842,046 A | 11/1998 | Kajitani | |
| 5,977,964 A | * 11/1999 | Williams et al. | ............... 386/83 |
| 2002/0057893 A1 | * 5/2002 | Wood et al. | .................... 386/46 |

FOREIGN PATENT DOCUMENTS

| | | |
|---|---|---|
| EP | 0737980 | 10/1996 |
| JP | PUPA 8-9330 | 1/1996 |
| JP | 08172645 | 7/1996 |
| JP | 08195932 | 7/1996 |
| JP | PUPA 8-203246 | 8/1996 |
| JP | PUPA 10-66049 | 3/1998 |
| JP | PUPA 10-228728 | 8/1998 |
| JP | PUPA 10-248050 | 9/1998 |
| WO | WO 97/46016 | 5/1997 |
| WO | WO97/30544 | 8/1997 |

OTHER PUBLICATIONS

IBM TDB, "MPEG Menu Manager", vol. 38, No. 09, Sep. 1995, pp. 291–295.
IBM TDB, "User Guided Selection or Elimination of Identified Information in Video Sequence", vol. 39, No. 08, Aug. 1996, pp. 141–146.
IBM TDB, "Method to Synchronize Local Moving Picture Expert's Group Decoder in Incoming Moving Picture Expert's Group Data Stream", vol. 40, No. 12, Dec. 1997, pp. 9–10.

(List continued on next page.)

*Primary Examiner*—Huy Nguyen
(74) *Attorney, Agent, or Firm*—Leslie A. Van Leeuwen

(57) ABSTRACT

A multi-user system, method, and computer-usable medium facilitate time-shifting of television program viewing for users. Each user is identified by an associated user profile, and a program schedule, including a list of desired programs to be recorded, is maintained for each user. The television programs are recorded and stored on a hard disk, or other nonvolatile storage, for later viewing by the users. The television programs are preferably stored in a compressed format. Each user can log into the system, at his convenience, and view any of the television programs that have been recorded for him. There is no shuffling through numerous videocassette tapes or skipping over other users' recorded programs to find a desired television program. An option may be used to specify how long to save a recorded television program before it can be erased and overwritten with another program. A master user or users, such as a parent or parents, can add a new user to the system by setting up a new user profile. The master user may set options or restrictions for the new user. If a permanent copy of a television program is desired, it can be written to another medium, such as a compact disk, a DVD, or a videocassette tape.

38 Claims, 14 Drawing Sheets

OTHER PUBLICATIONS

IBM TDB, "Stream Embedded Compressor/Decompressor", vol. 38, No. 09, Sep. 1995, pp. 273–276.

SMPTE Journal, "Unified Hybird Recorder: Combining Hard Disk Drive, Betacam SX, and Analog Betacam", I Sato et al, vol. 106, No. 9, Issue 09/97, pp. 611–617.

Computer Design, "Shrinking Hardware for MPEG–2", M. Elphick, vol. 37, No. 5, pp. 88–92.

International Broadcasting Convention Sep. 14–18 1995, Amsterdam, "Approaching Real–Time: Digital Disk Recorder and Workstation Interchange of Video Streams", J. Alvarez, IEEE Conference Publication No. 413, pp. 494–499.

Signal Processing of HDTV III, Proceedings of the Fourth International Workshop on HDTV and Beyond, Italy, Sep. 4–6, 1991, "An HDTV TCI–Codec LSI with a PLL for Signal Recording and Transmission", T. Odaka et al, pp. 121–128.

Proceedings IEEE International Conference on Multimedia Computing and Systems '97, "Closed–Loop MPEG Video Rendering", B. Shen et al, pp. 286–293.

Chongbo Kwahakhoe Nomunji C (J. of the Korea Information Science Society, section C, Computing Practices), "Temporal Multi–resolution Video Playback Based on Reconstructing MPEG–1 Streams", J. Cho, vol. 4, Issue 4, 08/98, pp. 439–448. (Abstract attached).

* cited by examiner

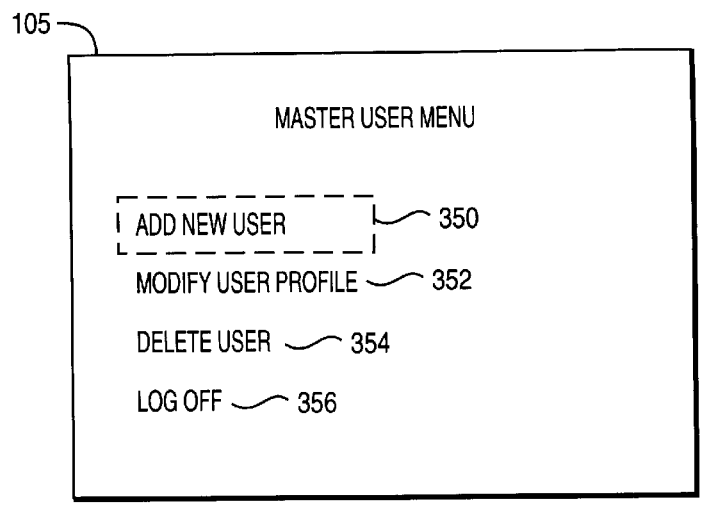

502 — USER NAME - KATIE
504 — PASSWORD - RED
506 — 6 HRS PER WEEK RECORD LIMIT
CONTENT RESTRICTIONS - G
SAT; SUN PLAYBACK ALLOWED

| CHANNEL | DAYS | HOURS | TEXT | REPEAT | # COPIES RETAINED | QUALITY | PRIORITY | PLAY WHERE LEFT OFF | FILENAME (S) |
|---|---|---|---|---|---|---|---|---|---|
| 5 | M-F | 5:30 p.m. - 6:30 p.m. | News | ✓ | 5 | 2 | 1 | N | |
| 7 | T | 1 p.m. - 2 p.m. | Talk Show | ✓ | 1 | 3 | 3 | Y | |
| 3 | Su | 9 p.m. - 10 p.m. | Drama | ✓ | 3 | 1 | 1 | Y | |
| | | | | | | | | | |

FIG. 10

MULTI-USER VIDEO HARD DISK RECORDER

FIELD OF THE INVENTION

The present invention relates to the field of information handling systems, and, more particularly, to a multi-user video hard disk recorder for recording and replaying television programs.

BACKGROUND OF THE INVENTION

Many television viewers use video cassette recorders (VCRs) to record television programs for later viewing, a process referred to as "time shifting." VCRs allow a viewer to record a television program at any time, and replay the program when it is convenient for the viewer. If several people wish to view the same recorded program, each can replay the program at his convenience.

However, there are several disadvantages associated with VCRs. VCRs are often difficult to program. A videocassette tape can only hold a few hours of programming. Thus, to record many hours of programming, a viewer must steadily feed the VCR with videocassette tapes. Later, the viewer may have to search through many videocassette tapes to find a desired program. If several people use the same videocassette tapes to record programs, then an individual may have to skip over other people's recorded programs to find the program he wishes to view.

VCRs pose additional concerns for parents who wish to limit or screen their children's television viewing. Some parents only allow their children to watch television during certain times of the day or week. However, once a television program has been recorded, a child can replay the program at any time. The only way to ensure that the child can not replay the program is to physically keep the videocassette tape from the child until the child's allowed viewing time. In addition, some parents wish to control which programs, or types of programs, their children are allowed to view. However, if several family members record television programs on the same videocassette tape, a child may view programs that his parents do not wish him to view. This may happen inadvertently, as the child skips over other family member's recorded programs, or on purpose, once the child realizes there are more "interesting" programs recorded on the same videocassette tape.

Another problem with current VCRs and videocassette tapes is the problem of reusing tapes. For example, if a particular videocassette tape contains five hours of programming, it may be desirable to retain some of the recorded programs longer than others. The viewer may desire to retain the first two hours of programming for a week, the third hour of programming for two days, and the third hour of programming for a month. This quickly becomes inconvenient to track, and it is likely that the entire videocassette tape will simply be retained, as is, for at least a month. Thus, portions of tape that could be reused are not reused.

Consequently, it would be desirable to have a system and method for easily recording and replaying audio/video data, such as television programs. It would also be desirable to allow many people to easily use the same system, without having to shuffle through many tapes and skip over each other's recorded programs. It would be desirable to be able to place restrictions on some users regarding the amount and type of television programs that may be recorded and viewed. It would be further desirable to be able to easily retain and erase recorded data.

SUMMARY OF THE INVENTION

Accordingly, the present invention is directed to a multi-user system, method, and computer-usable medium for recording and storing television programs on a hard disk, or other nonvolatile storage, for later viewing by users. Each user is identified by an associated user profile, and a program schedule, including a list of desired programs to be recorded, is maintained for each user. Each user can log into the system, at his convenience, and view any of the television programs that have been recorded for him. There is no shuffling through numerous videocassette tapes or skipping over other users' recorded programs to find a desired television program.

The television programs are stored on a hard disk, or in another nonvolatile storage, preferably in a compressed format. An option may be used to specify how long to save a recorded television program before it can be erased and overwritten with another program. A master user or users, such as a parent or parents, can add a new user to the system by setting up a new user profile. The master user may set restrictions for the new user. For example, the new user may only be allowed to record and/or view a certain number of hours of television programming per week. The new user may only be allowed to view his saved television programs at certain times during the week, such as on weekends. The master user may also restrict the type of shows the new user can record (e.g., by using V-chip ratings), or prevent the user from recording particular shows or shows that air during certain time periods or on certain channels.

If a permanent copy of a television program is desired, it can be written to another medium, such as a compact disk, a DVD, or a videocassette tape. Security controls may be used to keep all others, or some selected others, from viewing a program that has been saved to another medium.

An advantage of the present invention is that users do not have to keep track of which tapes are being fed into a VCR to record which shows. Another advantage of the present invention is that there is no need to skip over other people's shows to view a desired show. A further advantage of the present invention is that parents can have greater control over the amount and type of shows viewed by their children, and can limit their children's viewing time to certain time periods.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which:

FIGS. 4, 5, and 6 are exemplary screen displays illustrating steps shown in FIG. 3;

FIG. 10 is an exemplary user schedule;

DETAILED DESCRIPTION OF A PREFERRED EMBODIMENT OF THE INVENTION

Figure 1A:
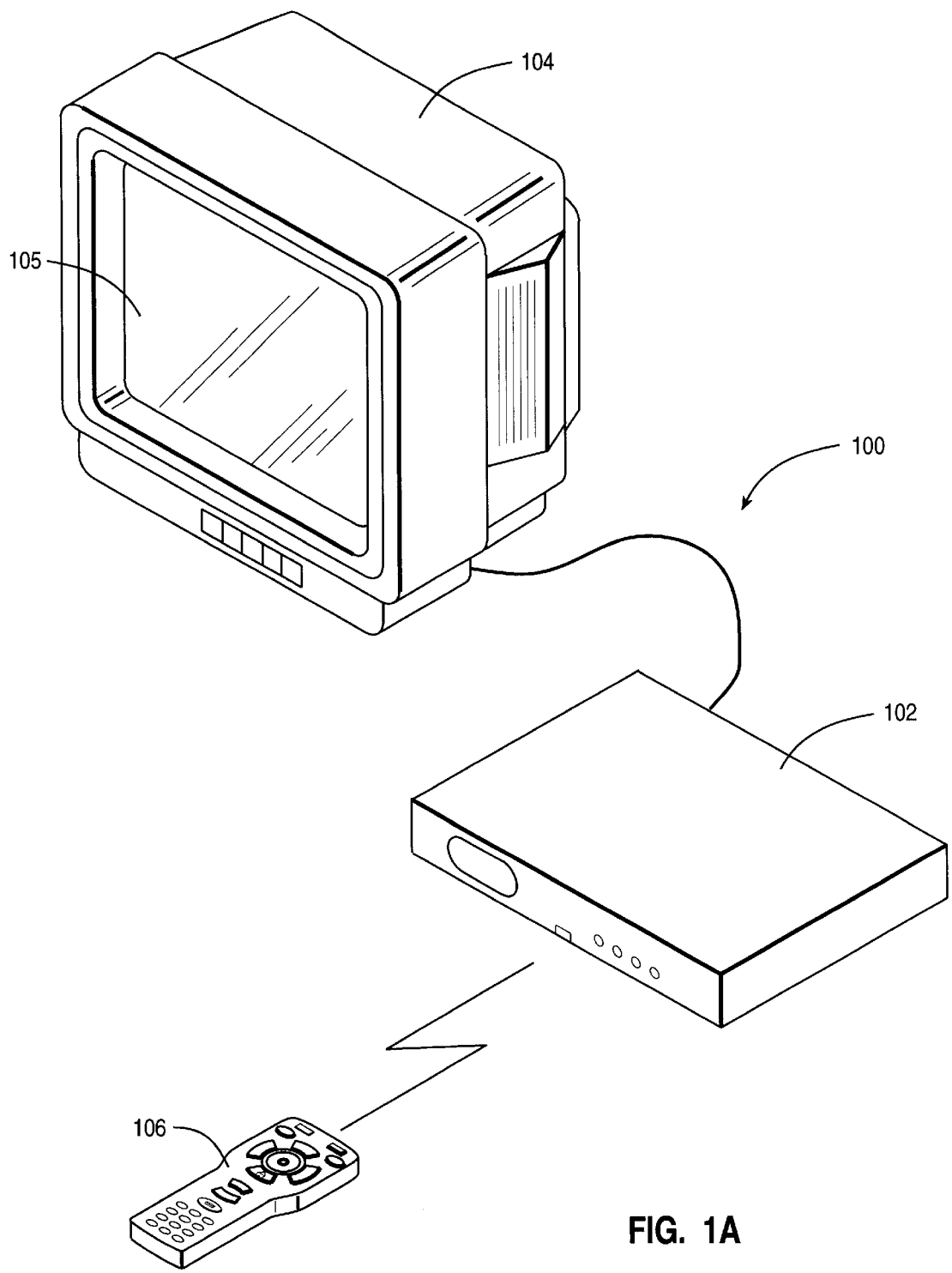
FIGS. 1A–1D depict various pictorial representations of an information handling system in which the present invention may be implemented.

With reference now to the figures, and in particular with reference to FIGS. 1A through 1D, various pictorial representations of an information handling system in which a preferred embodiment of the present invention may be implemented are depicted. FIG. 1A is a pictorial representation of the information handling system as a whole. Information handling system 100 in the depicted example is a set-top box providing, with minimal economic costs for hardware to the user, access to the Internet. Information handling system 100 includes a data processing unit 102, which is preferably sized to fit in typical entertainment centers and provides all required functionality conventionally found in personal computers to enable a user to "browse" the Internet. Additionally, data processing unit 102 may provide other common functions such as, for example, serving as an answering machine, transmitting or receiving facsimile transmissions, or providing voice mail facilities.

Data processing unit 102 is connected to television 104 for display of graphical information on display screen 105. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device in conventional personal computers, including the ability to move a cursor on a display and select items.

Figure 1B:
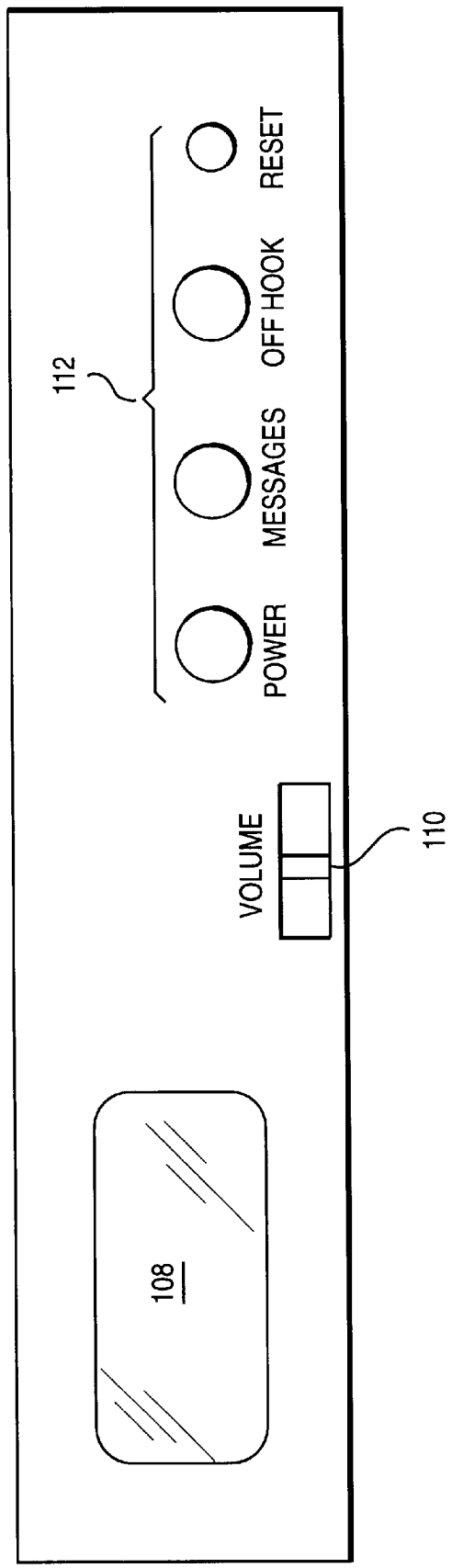

FIG. 1B is a pictorial representation of the front panel of data processing unit 102 in accordance with a preferred embodiment of the present invention. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 1C:
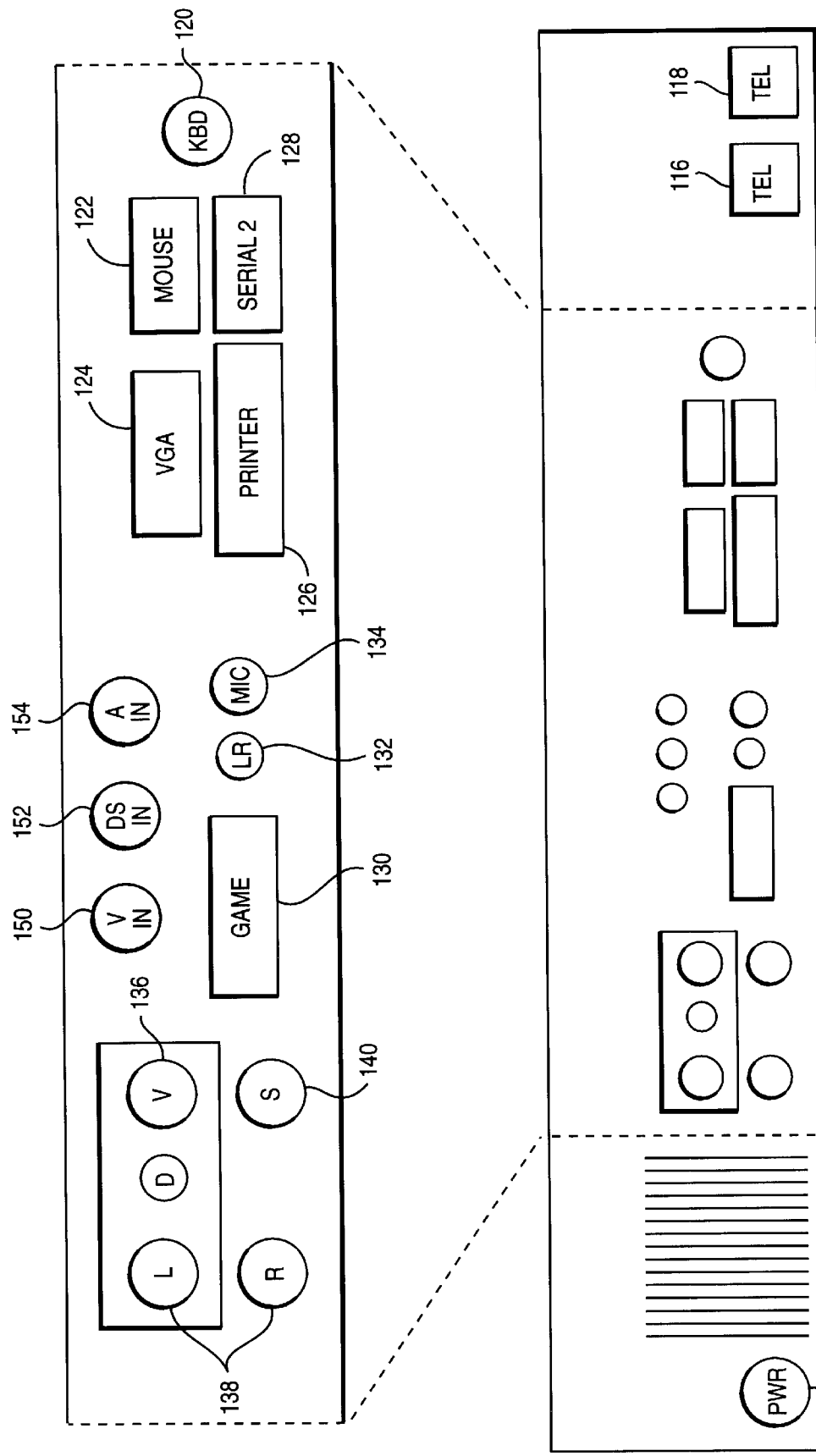

FIG. 1C is a pictorial representation of the rear panel of data processing unit 102 in accordance with a preferred embodiment of the present invention. A three wire (ground included) insulated power cord 114 passes through the rear panel. Standard telephone jacks 116 and 118 on the rear panel provide an input to a modem from the phone line and an output to a handset (not shown). The rear panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102. Video in (V IN) 150 receives video data (e.g., from television 104 or from a VCR). Digital Satellite in (DS IN) 152 receives compressed, digital audio and video data from a satellite receiver (not shown), while Antenna in (A IN) 154 receives audio and video data from an antenna connection (not shown).

Video connection 136, a standard coaxial cable connector, connects to the video-in terminal of television 104. Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel 3/4 modulator (not shown) may be connected in-line with the antenna connection.

Figure 1D:
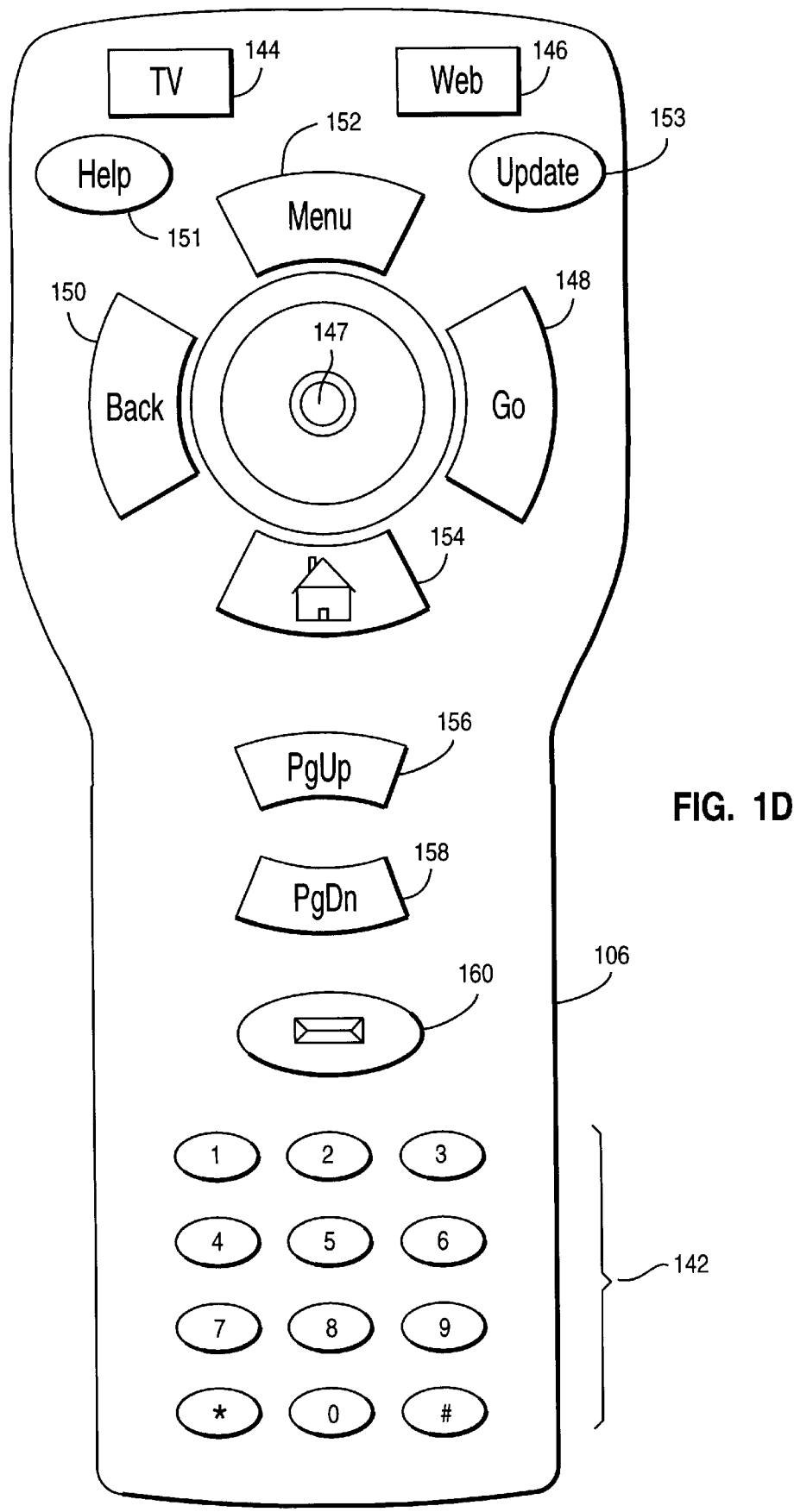

FIG. 1D is a pictorial representation of remote control unit 106 in accordance with a preferred embodiment of the present invention. Similar to a standard telephone keypad, remote control unit 106 includes buttons 142 for Arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. A pointing device 147, which is preferably a track point or "button" pointing device, is included on remote control unit 106 and allows a user to manipulate a cursor on the display of television 104. "Go" and "Back" buttons 148 and 150, respectively, allow a user to select an option or return to a previous selection. "Menu" button 152 causes a context-sensitive menu of options to be displayed, while home button 154 allows to user to return to a default display of options. "PgUp" and "PgDn" buttons 156 and 158 allows the user to change the content of the display in display-sized blocks rather than by scrolling. The message button 160 allows the user to retrieve messages. In addition to, or in lieu of, remote control unit 106, an infrared keyboard (not shown) with an integral pointing device may be used to control data processing unit 102. The integral pointing device is preferably a track point or button type of pointing device. A wired keyboard (also not shown) may also be used through keyboard connection 120, and a wired pointing device such as a mouse or track ball may be used through mouse port 122. When a user has one or more of the remote control units 106, infrared keyboard, wired keyboard and/or wired pointing device operable, the active device locks out all others until a prescribed period of inactivity has passed.

Figure 2:
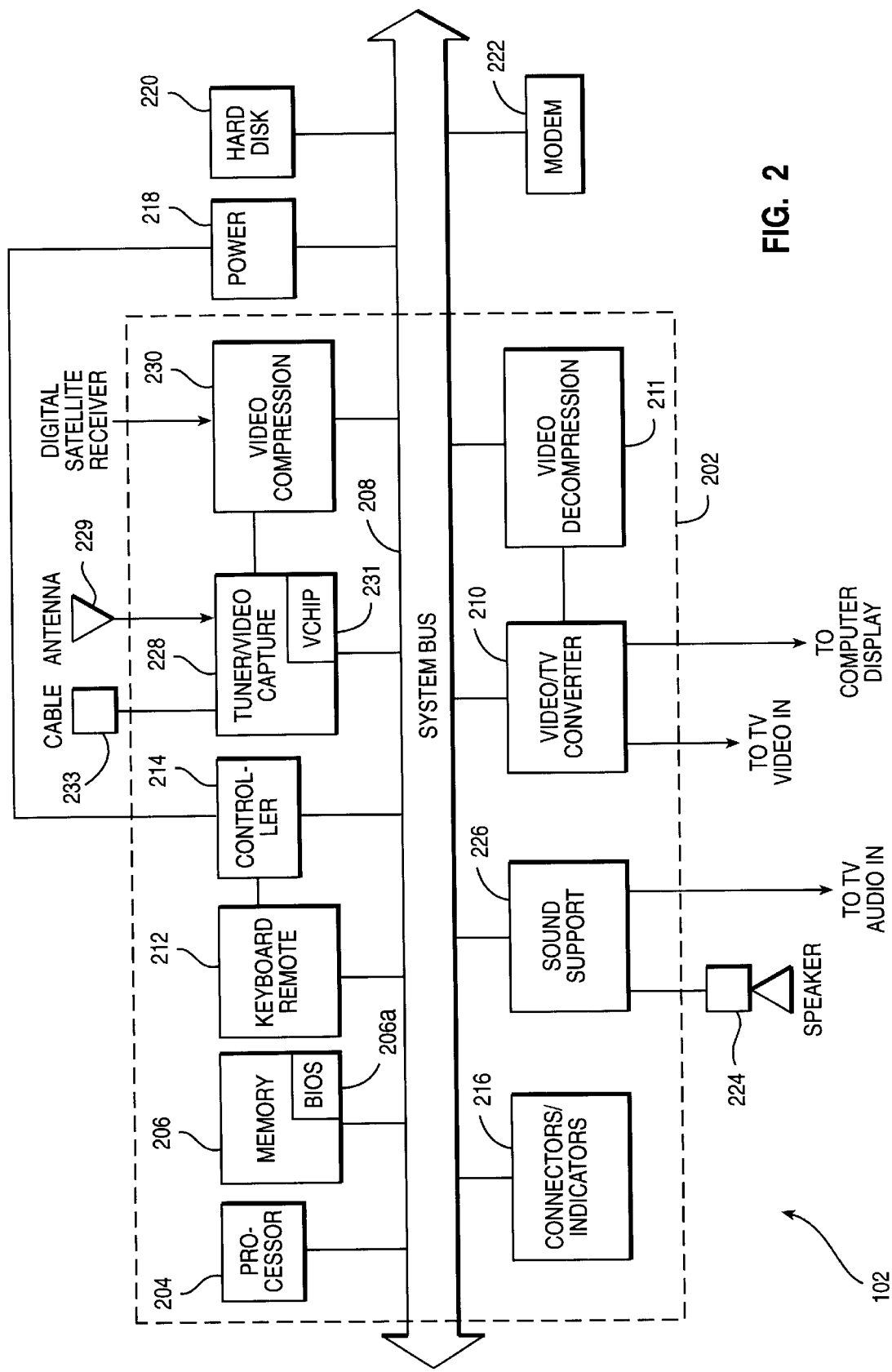
FIG. 2 is a block diagram depicting major components of the information handling system.

Referring now to FIG. 2, a block diagram of the major components of data processing unit 102 in accordance with a preferred embodiment of the present invention is portrayed. As with conventional personal computers, data processing unit 102 includes a motherboard 202 containing at least one processor 204 and memory 206 connected to system bus 208. Processor 204 is preferably at least a 486 processor operating at or above 100 MHz. Memory 206 includes read only memory (ROM) 206a containing a basic input/output services (BIOS) routine and may include cache memory and/or video RAM.

Video/TV converter 210 on motherboard 202 and connected to system bus 208 generates computer video signals for computer monitors, a composite television signal, and an S-Video signal. The functionality of video/TV converter 210 may be provided utilizing commercially available video and converter chips. Video decompression circuitry 211 decompresses video data before it is sent to video/TV converter 210. Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the functions provided by an infrared keyboard. Connectors/indicators 216 on motherboard 202 provide the connections and indicators on data processing unit 102 described above.

Tuner/video capture circuitry 228 receives television signals, via cable connection 233 or via antenna 229. Tuner/video capture circuitry 228 separates the incoming television signals into audio signals and video signals. The video signals are converted from analog to digital signals, and then may be compressed, via video compression circuitry 230. In the described embodiment, video compression circuitry 230 is MPEG-2 compression circuitry, although one skilled in the art will realize that other types of compression, such as MPEG-1, may also be used. Tuner/video capture circuitry 228 may also include a V-chip 231, or other type of screening circuitry.

Sound support 226 includes circuitry to convert audio signals from analog to digital, and vice versa. Sound support 226 also includes circuitry to compress and decompress digital audio signals. Audio signals may be sent from sound support 226 to speaker 224 and/or the audio in connection of television 104.

External to motherboard 202 in the depicted example are power supply 218, hard disk 220, and modem 222. External Power supply 218 is a conventional power supply except that it receives a control signal from controller 214 which effects shut down of all power to motherboard 202, hard drive 220, and modem 222. In some recovery situations, removing power and rebooting is the only guaranteed method of resetting all of these devices to a known state. Thus power supply 218, in response to a signal from controller 214, is capable of powering down and restarting data processing unit 102.

Hard disk 220 contains operating system and applications software for data processing unit 102. Data, such as television program data, is also be stored on hard disk 220. Modem 222, inserted into a slot mounted sideways on motherboard 202, is preferably a 33.6 kbps modem supporting the V.42bis, V34bis, V.34, V.17 Fax, MNP 1-5, and AT command sets.

Controller 214 is preferably one or more of the 805x family of controllers. Controller 214 is continuously powered and, when data processing unit 102 is turned on, monitors the system for a periodic "ping" indicating that data processing unit 102 is operating normally. In the event that controller 214 does not receive a ping within a prescribed timeout period, controller 214 removes power from the system and restarts the system. This may be necessary, for example, when the system experiences a general protection fault. If multiple attempts to restart the system prove unsuccessful, controller 214 shuts off data processing unit 102 and signals that service is required through indicators 216. Thus, data processing unit 102 is capable of self-recovery in some circumstances without involvement by a user.

Controller 214 also receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use and specifies the boot sector selection during any power off-on cycle.

Those skilled in the art will recognize that the components depicted in FIGS. 1A–1D and 2 and described above may be varied for specific applications or embodiments. Such variations in which the present invention may be implemented are considered to be within the spirit and scope of the present invention.

The present invention is a multi-user video hard disk recorder system and method for recording and storing television programs on a hard disk for later viewing by users. The system and method support multiple users, with each user identified by an associated user profile. An individual user logs into the system and specifies which television programs he wishes to have recorded and stored. The system maintains a program schedule for each user, and records and stores desired television programs for each user. Each user can then log into the system, at his convenience, and view any of the television programs that have been recorded for him. There is no shuffling through numerous videocassette tapes or skipping over other users' recorded programs to find a desired television program.

The television programs are stored on a hard disk, or in another nonvolatile storage, preferably in a compressed format. Compressing the television programs allows many hours of programming to be stored on a hard disk. For example, it is possible to store up to 20 hours of suitably compressed television programming on an 11 gigabyte hard drive. An option may be used to specify how long to save a recorded television program before it can be erased and overwritten with another program. For example, weekly shows may be erased after one or two weeks, daily news shows may be erased after one or two days, lottery results may be saved until the next lottery drawing, and so on. If more than one user chooses to have the same television show recorded and saved, then the show is saved for a long enough period of time to satisfy all users' retention requirements for the show.

A master user or users, such as a parent or parents, can add a new user to the system by setting up a new user profile. The master user may set restrictions for the new user. For example, the new user may only be allowed to record and/or view a certain number of hours of television programming per week. The new user may only be allowed to view his saved television programs at certain times during the week, such as on weekends. The master user may also restrict the type of shows the new user can record (e.g., by using V-chip ratings), or prevent the user from recording particular shows or shows that air during certain time periods or on certain channels.

If a permanent copy of a television program is desired, it can be written to another medium, such as a compact disk, a DVD, or a videocassette tape. Security controls may be used to keep all others, or some selected others, from viewing a program that has been saved to another medium.

By using the present invention, users do not have to keep track of which tapes are being fed into a VCR to record which shows. There is no need to skip over other people's shows to view a desired show. Parents can have greater control over the amount and type of shows viewed by their children, and can limit their children's viewing time to certain time periods.

Figure 3:
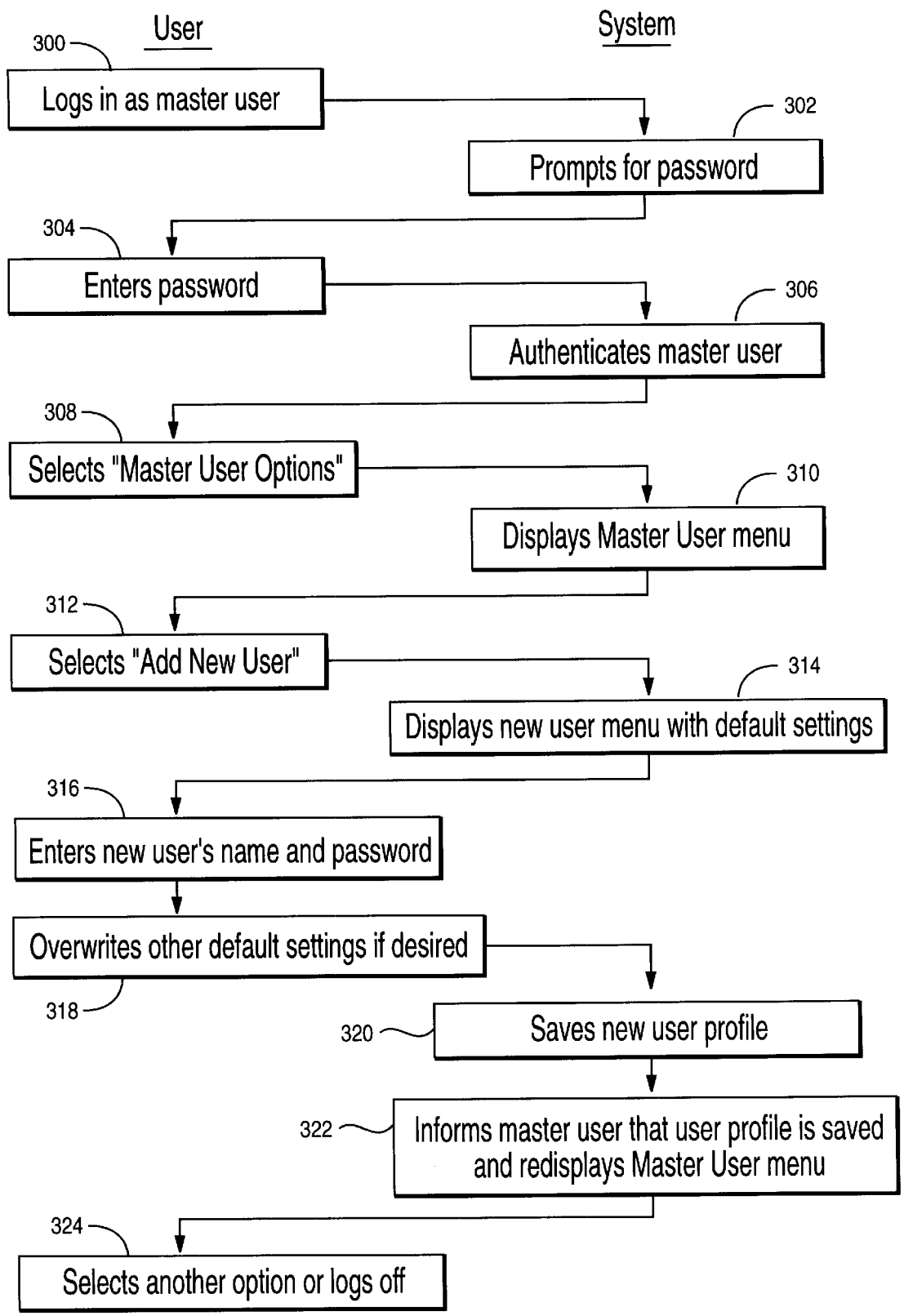
FIG. 3 is a flow chart depicting a method for adding a new user to the system.

Referring to FIG. 3, a method for adding a new user to the system will now be described. The master user, e.g., a parent, logs in as the master user (step 300). The system prompts the master user for a password (step 302). The user enters his password (step 304), and the system authenticates him as the master user (step 306). Note that steps 300 through 306 could be replaced by various other types of security mechanisms, such as a smart card that authenticates the master user. The master user selects "Master User Options" (step 308). Note that this selection may be accomplished via a selection list, pull-down menu, or another type of selection mechanism.

The system displays a Master User Menu (step 310). An exemplary Master User Menu is shown in FIG. 4, as it may appear on screen 105 of television 104. As shown in FIG. 4, the master user may be presented with a variety of options, such as Add New User 350, Modify User Profile 352, Delete User 354, and Log Off 356. In FIG. 4, Add New User 350 has been highlighted by the master user, as depicted in step 312 of FIG. 3.

Referring back to FIG. 3, the system displays a New User Menu with some default settings (i.e. options) already filled in (step 314). An exemplary New User Menu is shown in FIG. 5. A space is provided to fill in the new user's name 360, password 362, and other options and/or restrictions. The restrictions shown in FIG. 5 include maximum hours per time period which may be recorded 364, content restrictions 368, and playback hours 370. Those skilled in the art will realize that a variety of different settings or options may be available for a new user. The restrictions shown in FIGS. 5 and 6 are for illustrative purposes only, and are not meant to be limiting.

Referring back to FIG. 3, the master user enters the new user's name and selects a password for the new user (step 316). Rather than setting a password, a variety of security controls may be used for each user in the system. As discussed above, these security controls may include a smart card for each user, or some other type of security mechanism. The master user may also overwrite any of the default settings for the new user (step 318). In the example shown in FIG. 6, the master user has charged the maximum hours per time period 364 from "24 hours per day" to "6 hours per week." Content restriction 368 has been changed from "none" to "G," thus indicating that only television programs with a V-chip rating of "G" may be recorded. Also, playback hours 370 have been changed from "all" to "Sat;Sun," indicating that the new user can only view recorded shows on Saturday and Sunday. Referring back to FIG. 3, after the master user has completed the user profile, it is saved by the system (step 320). The system informs the master user that the user profile is saved, and then redisplays the Master User menu (step 322). The master user then selects another option or logs off (step 324). Those skilled in the art will realize that a variety of settings, options, and user preferences may be set for a user. The examples shown in FIGS. 3 through 6 are for illustrative purposes only, and are not meant to be limiting.

Figure 7:
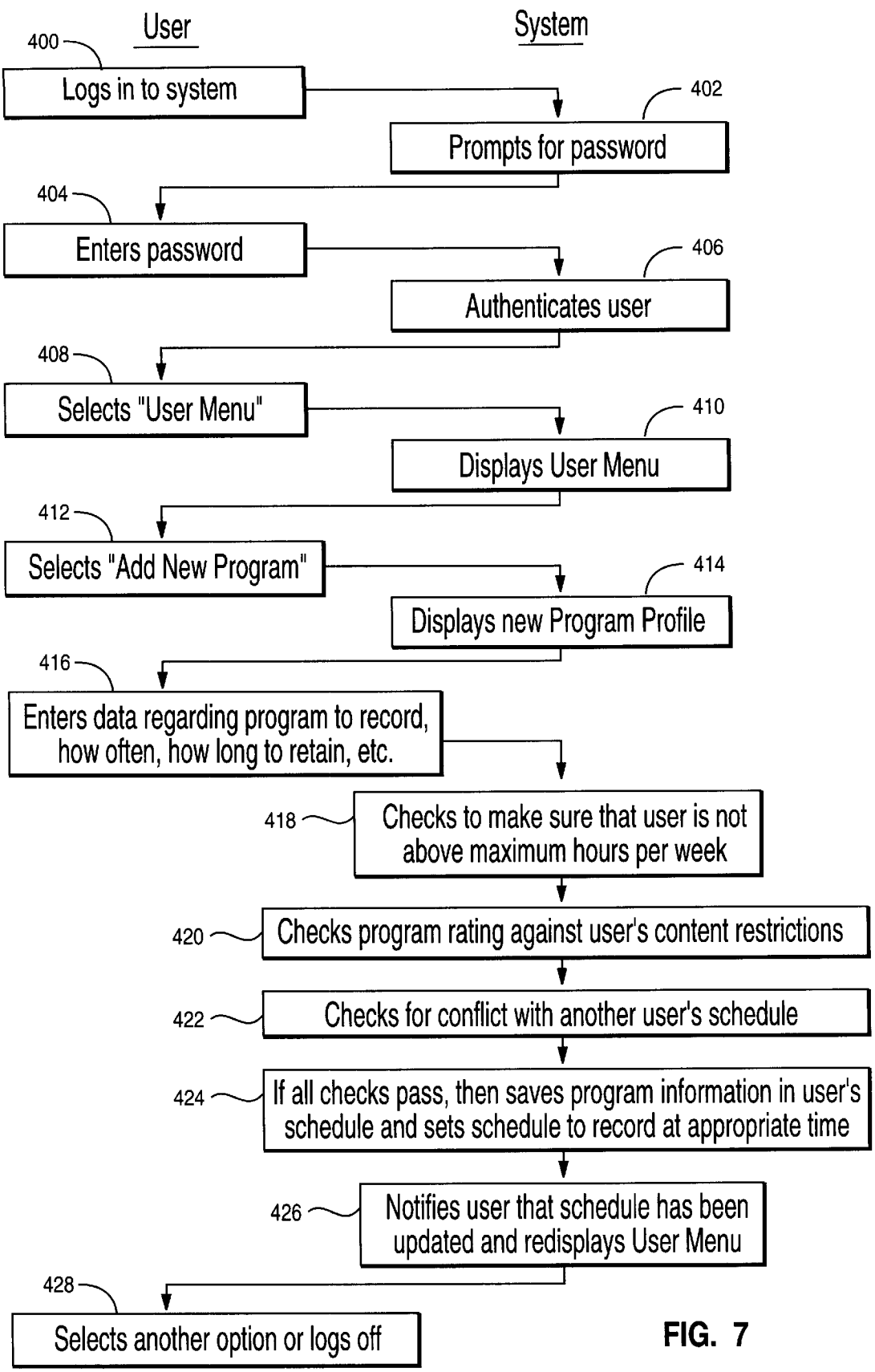
FIG. 7 is a flow chart depicting a method for setting a recording schedule for a selected program.
Figure 8:
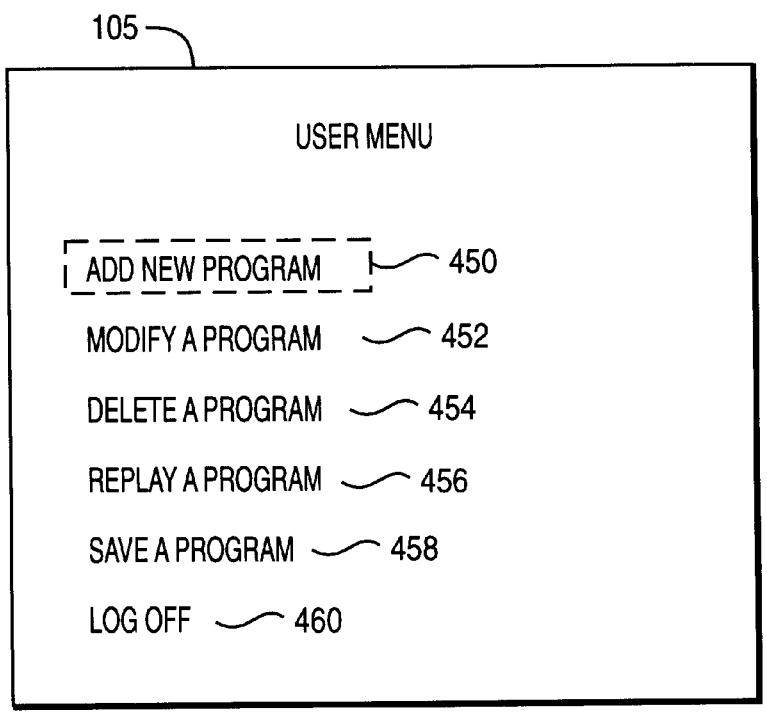
FIGS. 8 and 9 are exemplary screen displays illustrating steps shown in FIG. 7.

Referring to FIG. 7, a method for adding a program to a user's program schedule will now be described. The program schedule for a user contains data regarding the television programs that are to be recorded and saved for the user. As shown in FIG. 7, the user logs into the system (step 400), the system prompts the user for his password (step 402), the user enters his password (step 404), and the system authenticates the user (step 406). The user then selects "User Menu," (step 408), and the system displays the User Menu (step 410). An exemplary User Menu is shown in FIG. 8. As shown in FIG. 8, the user is presented with a variety of options, such as Add New Program 450, Modify A Program 452, Delete A Program 454, Replay A Program 456, Save A Program 458, and Log Off 460. In the example shown in FIG. 8, the user has highlighted Add New Program 450, as indicated in step 412 of FIG. 7.

Figure 9:
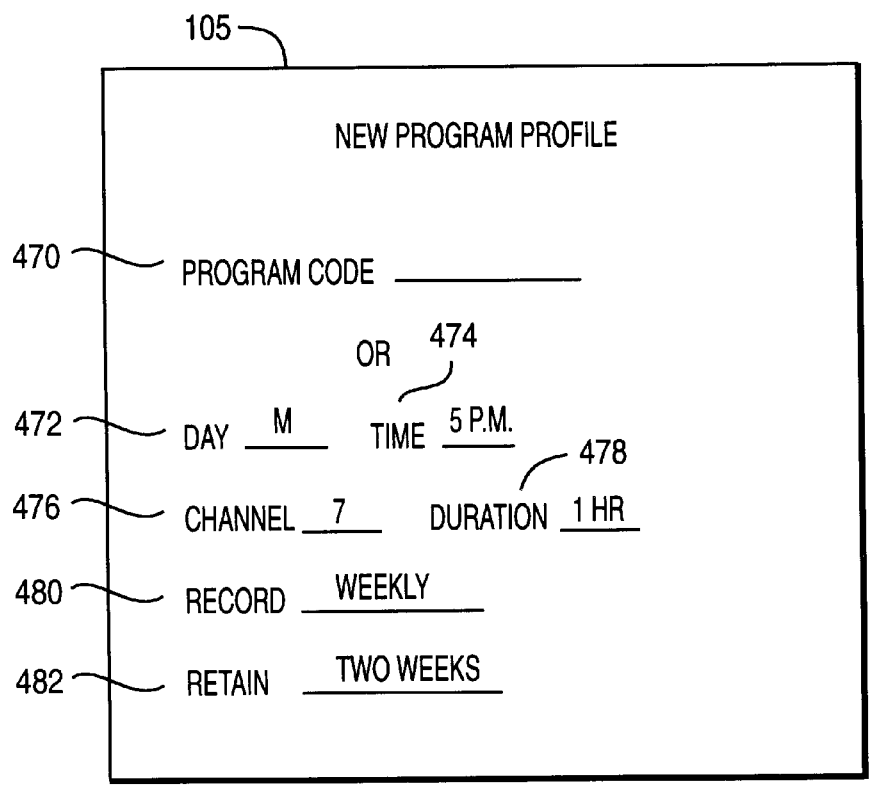

Referring back to FIG. 7, the system displays the New Program Profile (step 414). An exemplary New Program Profile is shown in FIG. 9. The user enters data regarding the new program to be added to his program schedule (step 416). As shown in FIG. 9, the user may select a program based on a program code 470, or may specify a day 472, time 474, channel 476, and duration 478 for recording. The user specifies how often the selected television program is to be recorded 480, and how long it is to be retained 482. Those skilled in the art will realize that there are a variety of other options that a user may specify regarding the television program. Some of these options are discussed below, with reference to FIG. 10.

Referring back to FIG. 7, the system checks the user's choices against the restrictions set in his user profile. The system checks to ensure that the user is not attempting to record more than his maximum allowed hours per time period (step 418), and that the selected program is allowed within the user's content restrictions (step 420). The system also checks to ensure that the user's request does not conflict with another user's request for the same time period (step 422). In other words, a user can not request that a television program be recorded for him at a particular time on a particular channel if another user has already requested that a different television program be recorded at the same time on a different channel. Of course, the system may record the same television program for more than one user. Also, as discussed below with reference to FIG. 11, the system may record different shows at the same time, if there is more than tuner/video capture circuit in the system. One skilled in the art will realize that other checks may be made at this point, depending on the types of restrictions and user preferences that are set in the user profile. If the user's selection passes all checks, the program information is saved in the user's program schedule, and the system adds the requested television program to the user's program schedule to record the program at the appropriate time (step 424). The system notifies the user that his schedule has been updated, and then redisplays the User Menu (step 426). The user then selects another option or logs off (step 428).

An exemplary user profile and program schedule, as it may be saved by the system, is illustrated in FIG. 10. Referring now to FIG. 10, user profile data 500, includes the user name 502, password 504, and restrictions 506. In the example shown in FIG. 10, there are three entries 508, 510, and 512 listed in the user's program schedule. Each entry indicates the channel 514, days of the week 516, and hours 518 to record, along with a text description of the television program to be recorded 520. Various options may be selected for each entry in the program schedule. As discussed above, with reference to FIG. 7, there are a variety of options that may be set. For example, the user may request that a television program be repeatedly recorded, i.e. recorded on a regular basis. This selection is indicated in Repeat column 522. The user may specify the number of repeated recordings to retain, i.e. # Copies Retained 524. A quality 526 may be selected, indicating the quality of the compression to be used when storing the television program on to the hard disk. The higher the quality selected, the more space the television program will take on the hard disk. A priority 528 may be set, indicating the importance of recording the show. In the case where more than one user wishes to have a television show recorded at the same time, the priority setting could be used to determine which show is recorded. An option may be set to allow a user to continue playing a recorded show where it left off the last time the user was watching the show. This option is specified in Play Where Left Off column 530.

When a television program is recorded and stored for a user, the system adds the filename 532 of the stored file to the appropriate entry. More than one filename 532 may be entered for a given entry, as more than one copy of a television program may be kept for the user.

Figure 11:
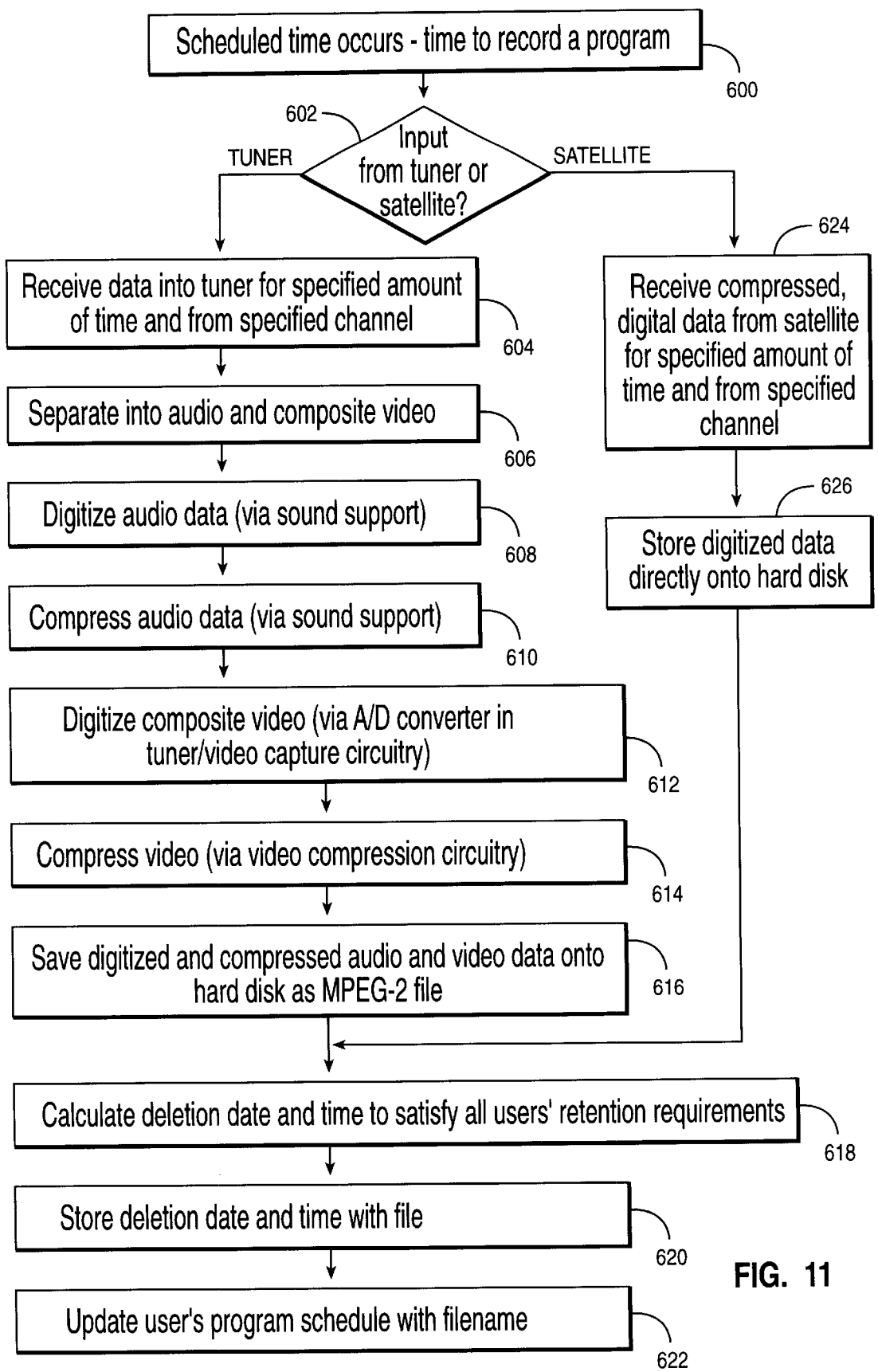
FIG. 11 is a flow chart depicting a method for recording a television program at a pre-selected time.

Referring to FIG. 11, a method for recording and saving a television program will now be described. The system determines (via a timer program) that a scheduled time has arrived, and it is time to record a television program (step 600). The system determines if the television input is from a tuner or a satellite (step 602). If the input is from a tuner, the program is received into the tuner for the specified length of time and from the appropriate channel (step 604). Those skilled in the art will realize that more than one television program may be recorded at the same time (e.g., if multiple users desire to have different shows recorded at the same time) by using multiple tuners.

The television signal is separated into its audio component and its composite video component (step 606) by tuner/video capture circuitry 228 (shown in FIG. 2). The audio data is digitized (step 608) and compressed (step 610) via sound support 226 (shown in FIG. 2). The video data is also digitized (step 612) by tuner/video capture circuitry 228, and then compressed (step 614) by video compression circuitry 230 (shown in FIG. 2). In the described embodiment, the compression is performed by MPEG-2 compression circuitry, however, one skilled in the art will realize that the compression may be accomplished via another type of compression circuit, or by a software compression program. The compression format may be MPEG-1, or some other known compression format.

The digitized, compressed audio data and the digitized, compressed video data are stored onto hard disk 220 (shown in FIG. 2) (step 616). In the described embodiment, they are stored as an MPEG-2 compressed file or files. A deletion time and date is calculated (step 618) and saved with the file (step 620). As discussed above, if more than one user has requested that a particular television program be recorded and saved, the deletion time and date is calculated to satisfy all the users' retention requirements. The user's program schedule is then updated with the filename of the saved file(s) (step 622).

If the television program is received from a satellite into a satellite receiver (i.e. the answer to the question in step 602 is "satellite"), the television program may already be in compressed, digital form. Thus, the data is received from the satellite for the specified amount of time and from the specified channel (step 624), and stored directly onto hard disk 220 (shown in FIG. 2) (step 626). Note that if the data received from the satellite is not compressed, it may be compressed by video compression circuitry 230 (shown in FIG. 2). The method then continues at step 618.

Figure 12:
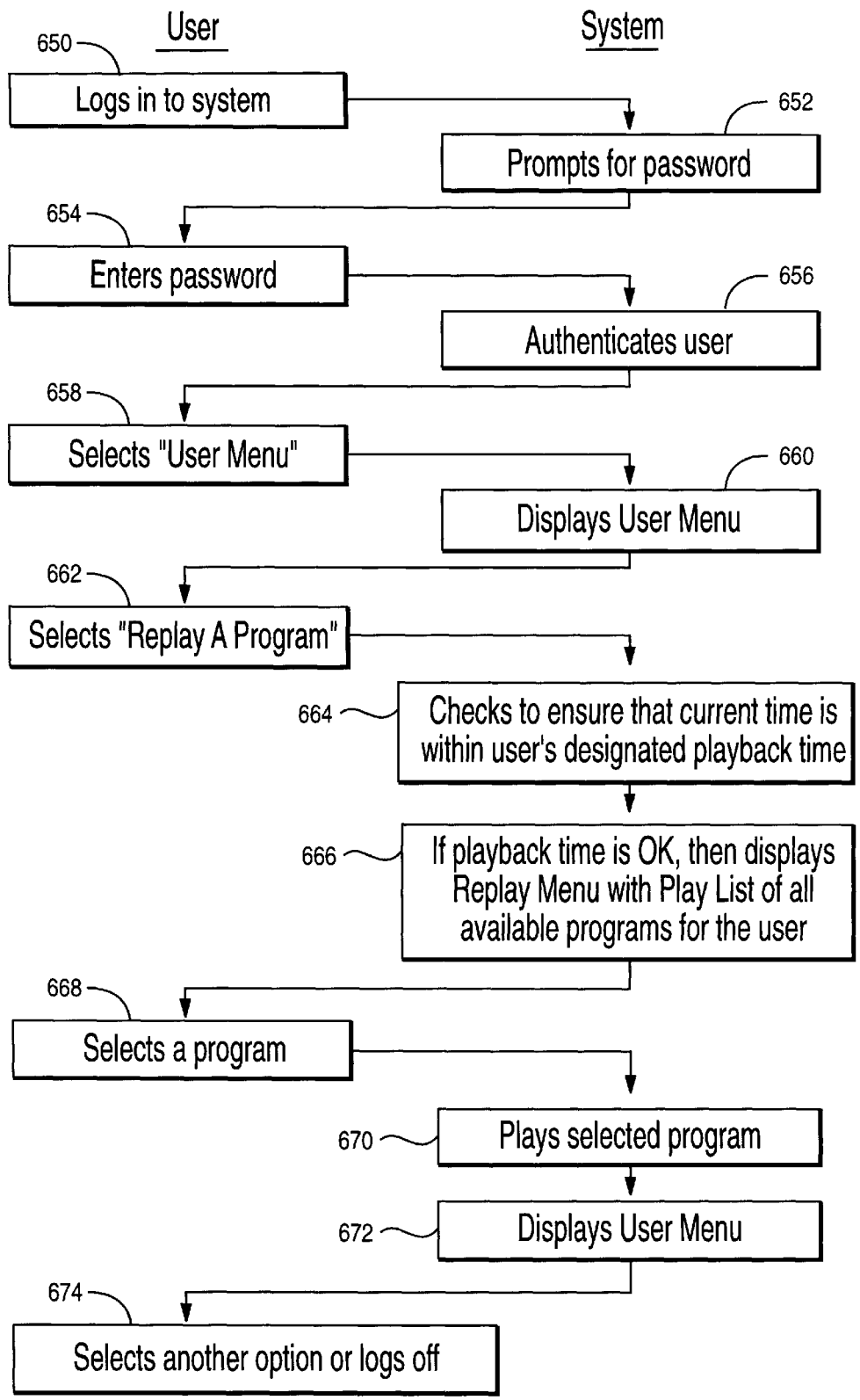
FIG. 12 is a flow chart depicting a method for displaying a saved television program.

Referring to FIG. 12, a method for displaying a recorded television program for a user will now be described. As shown in FIG. 12, the user logs into the system (step 650), the system prompts the user for his password (step 652), the user enters his password (step 654), and the system authenticates the user (step 656). The user then selects "User Menu," (step 658), and the system displays the User Menu (step 660). An exemplary User Menu is shown in FIG. 8. For purposes of the example, assume the users highlights Replay A Program 456. Referring again to FIG. 12, this step is depicted in step 662. The system checks the current time to ensure that it is within the user's allowed playback time (step 664). Note that other checks may be performed at this point. For example, if the user has a restriction regarding the number of hours of television program he may view per week, the system will check to ensure that the user has not already viewed television programs for more than the designated amount of time for the week. If all checks pass, a Repay Menu is displayed for the user, displaying the user's Play List (step 666). The Play List includes all the television programs that are stored and available for the user to view, and is obtained by searching the user's program schedule for entries with filenames indicating stored television programs. The user selects a television program from the Play List (step 668), and the selected television program is displayed for the user (step 670). After the television program is complete, the system displays the User Menu (step 672), and the user selects another option or logs off (step 674).

Figure 13:
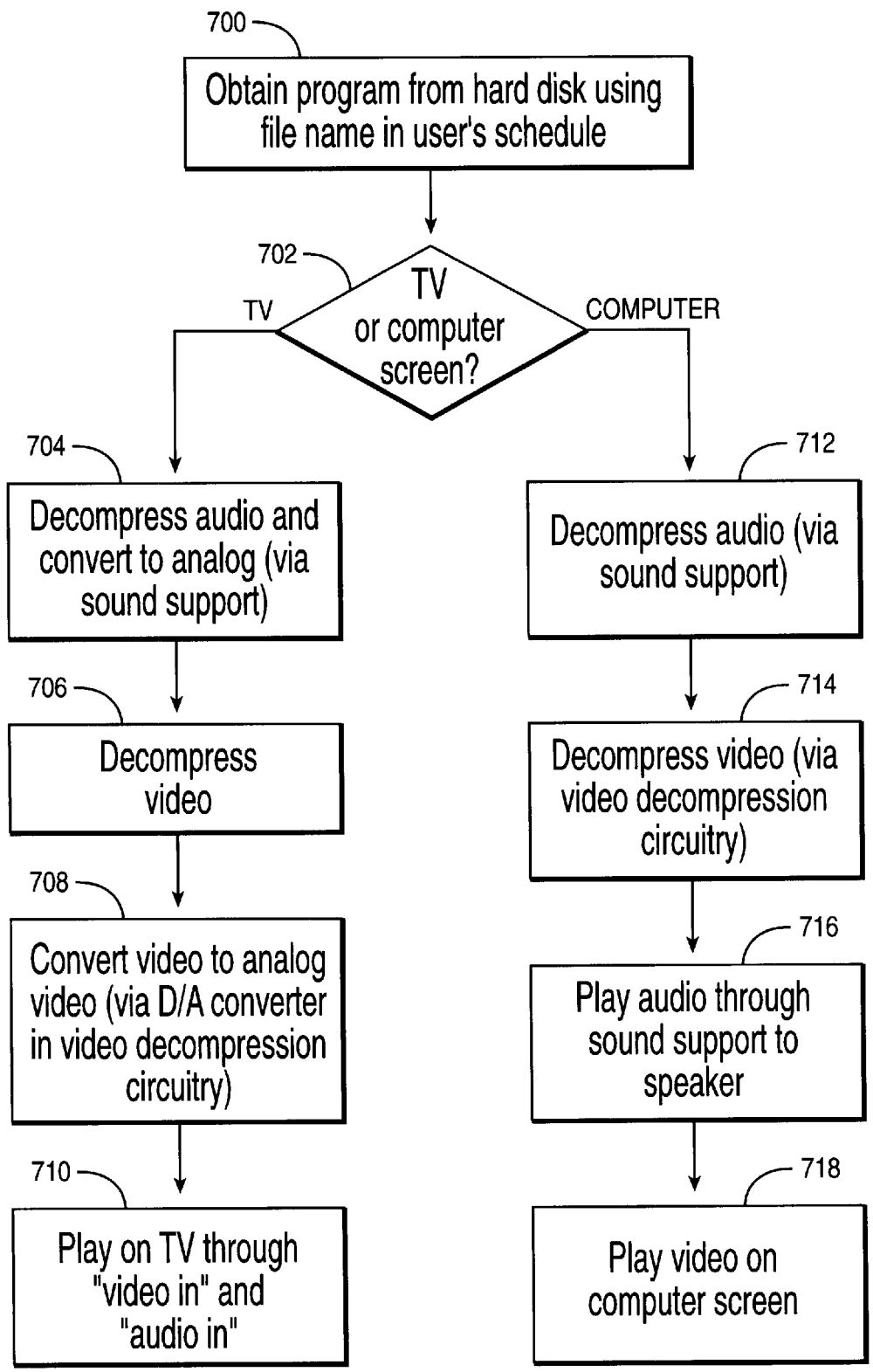
FIG. 13 is a flow chart depicting further details of the method of FIG. 12.

Referring to FIG. 13, further details regarding step 670 will be described. The selected television program is obtained from the hard disk (step 700) using the filename stored with the appropriate entry in the user's program schedule. The system determines whether the television program will be displayed on a television screen or a computer screen (step 702). If the television program is to be displayed on a television screen, the audio data is decompressed and converted to an analog audio signal (step 704) using sound support 226 (shown in FIG. 2). The video data is decompressed (step 706) by video decompression circuitry 211, and then converted to an analog video signal (step 708) using a digital-to-analog converter circuit in the decompression circuitry. The analog audio and video signals are then displayed through the "audio in" and "video in" connections on the television (step 710). If the television program is to be displayed on a computer screen (i.e. the answer to the question in step 702 is "computer"), then the audio data is decompressed and converted to an analog audio signal (step 712) by sound support 226. The video data is decompressed (step 714) by video decompression circuitry 211. The decompressed, analog audio signal is played through speaker 224 (step 716), and the decompressed video data is displayed on the computer screen (step 718).

Figure 14:
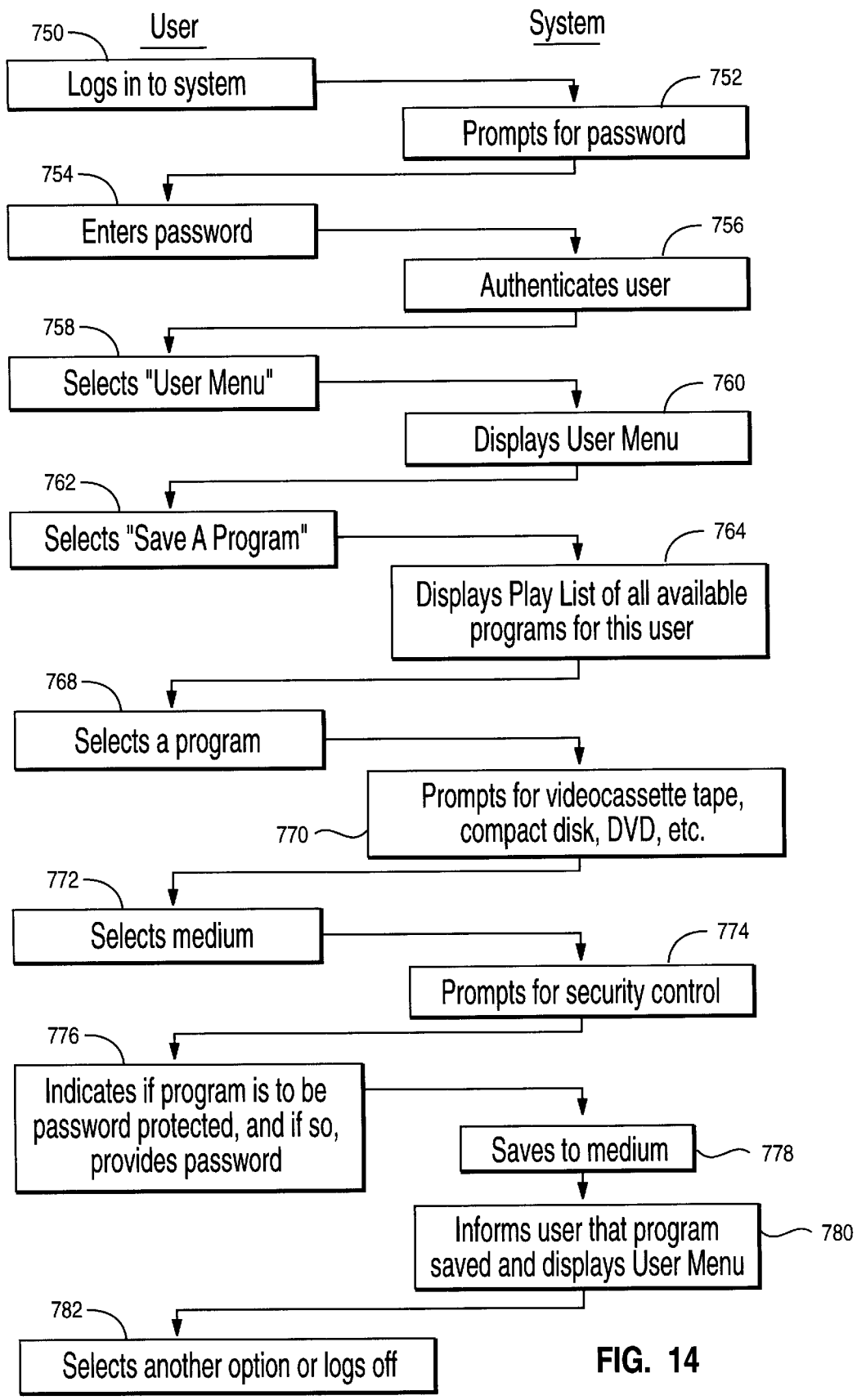
FIG. 14 is a flow chart depicting a method for saving a recorded television program to an alternate storage medium.

Referring to FIG. 14, a method for saving a stored television program to an alternate medium will now be described. As shown in FIG. 14, the user logs into the system (step 750), the system prompts the user for his password (step 752), the user enters his password (step 754), and the system authenticates the user (step 756). The user then selects "User Menu," (step 758), and the system displays the User Menu (step 760). An exemplary User Menu is shown in FIG. 8. For purposes of the example, assume the users highlights Save A Program 458. Referring again to FIG. 14, this step is depicted in step 762. The system then displays the user's Play List, displaying all available programs that have been saved onto the hard disk for the user (step 764). The user selects a television program to save (step 768). The system prompts the user for the type of medium (e.g., videocassette tape, compact disk, DVD, etc.) (step 770), and the user selects the desired medium (step 772). The system then prompts the user for any security controls (step 774), and, if desired the user may protect the television program with a password, or some other security mechanism (step 776). The system then saves the selected television program to the selected medium for the user (step 778). The system informs the user that the television program has been saved, and then displays the User Menu (step 780). The user then selects another option or logs off (step 782).

Although the invention has been described with a certain degree of particularity, it should be recognized that elements thereof may be altered by persons skilled in the art without departing from the spirit and scope of the invention. One of the implementations of the invention is as sets of instructions resident in the memory of one or more computer systems configured generally as described in FIG. 2. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art will appreciate that the physical storage of the sets of instructions physically changes the medium upon which it is stored electrically, magnetically, or chemically so that the medium carries computer usable information. The invention is limited only by the following claims and their equivalents.

What is claimed is:

1. A method for recording and playing television programs for a plurality of users, comprising:

creating a plurality of user profilers for the plurality of users, wherein each user profile contains one or more recording options and one or more playback options for a corresponding user;

creating a plurality of program schedules, wherein each program schedule contains data regarding one or more selected television programs to be recorded for a corresponding user;

recording the selected television programs as they air according to a corresponding user profile, wherein said recording includes saving the selected television programs in a nonvolatile storage;

in response to a play request from a first user, displaying a play list, wherein the play list contains one or more available television programs that have been saved for the first user; and in response to a play list selection from the first user, playing a selected one of the television programs that have been saved for the first user on the nonvolatile storage according to the first user profile.

2. A method according to claim 1, further comprising:

in response to the play list selection from the first user, determining if playing the selected television program for the first user violates any of the playback options in a first user profile; and in response to said determining, if playing the selected television program does not violate any of the playback options in the first user profile, then playing the selected television program.

3. A method according to claim 1, wherein said creating a plurality of program schedules further comprises:

receiving a request from the first user to record a desired television program;

in response to said receiving, determining if recording the desired television program for the first user violates any of the recording options in the first user profile;

in response to said determining, if recording the desired television program does not violate any of the recording options in the first user profile, then adding data regarding the desired television program to the first user's program schedule.

4. A method according to claim 1, wherein the user profiles are created in response to one or more requests from a master user.

5. A method according to claim 1, wherein the recording options include a number of television hours that may be recorded within a designated time period.

6. A method according to claim 1, wherein the recording options include a content restriction, wherein the content restriction determines a type of television program that may be recorded.

7. A method according to claim 1, wherein the playback options include a playback time restriction, wherein the playback time restriction indicates a time period in which television programs may be played.

8. A method according to claim 7, further comprising:

receiving a play request from a second user;

in response to said receiving, determining if a current time is within the time period in which television programs may be played for the second user; and in response to said determining, if the current time is within the time period in which television programs may be played for the second user, then displaying the play list.

9. A method according to claim 1, wherein said recording further comprises:

receiving a television program signal into a tuner;

separating the television program signal into an audio signal and a video signal;

digitizing the audio signal into a digitized audio signal;

digitizing the video signal into a digitized video signal;

compressing the digitized audio signal into a compressed, digitized audio signal;

compressing the digitized video signal into a compressed, digitized audio signal; and saving the compressed, digitized audio signal and the compressed, digitized video signal as one or more files on a hard disk.

10. A method according to claim 9, wherein said playing further comprises:

obtaining the files associated with the selected television program from the hard disk;

decompressing the compressed, digitized video signal into an uncompressed, digitized video signal;

decompressing the compressed, digitized audio signal into an uncompressed, digitized audio signal;

converting the uncompressed, digitized video signal into an analog video signal;

converting the uncompressed, digitized audio signal into an analog audio signal;

playing the analog video signal on a video display screen; and playing the analog audio signal through a speaker.

11. A method according to claim 1, wherein said recording further comprises:
   receiving a television program signal from a satellite, wherein the television program signal includes a compressed, digital audio signal and a compressed, digital video signal; and
   saving the compressed, digital audio signal and the compressed, digital video signal as one or more files on a hard disk.

12. A method according to claim 1, further comprising:
   receiving a save request from a third user to save a particular television program to a selected alternate storage; and
   in response to said receiving, saving the particular television program in the selected alternate storage.

13. A multi-user video recording system, comprising:
   means for receiving television program signals;
   a nonvolatile storage;
   means for creating a plurality of user profiles, for the plurality of users wherein each user profile contains one or more recording options and one or more playback options for a corresponding user;
   means for creating a plurality of program schedules, wherein each program schedule contains data regarding one or more selected television programs to be recorded for a corresponding user;
   means for recording the selected television programs as they air, according to a corresponding user profile wherein said means for recording includes means for saving the selected television programs in said nonvolatile storage;
   means for displaying a first play list, wherein the first play list contains one or more available television programs that have been saved for a first user; and
   means for playing a selected one of the television programs that have been saved for the first user or the nonvolatile storage according to the first user profiles.

14. A system according to claim 13, further comprising:
   means for determining if playing the selected television program for the first user violates any of the playback options in a first user profile.

15. A system according to claim 13, wherein said means for creating a plurality of program schedules further comprises:
   means for receiving a request from the first user to record a desired television program;
   means for determining if recording the desired television program for the first user violates any of the recording options in the first user profile; and
   means for adding data regarding the desired television program to the first user's program schedule.

16. A system according to claim 13, wherein the user profiles are created in response to one or more requests from a master user.

17. A system according to claim 13, wherein the recording options include a number of television hours that may be recorded within a designated time period.

18. A system according to claim 13, wherein the recording options include a content restriction, wherein the content restriction determines a type of television program that may be recorded.

19. A system according to claim 13, wherein the playback options include a playback time restriction, wherein the playback time restriction indicates a time period in which television programs may be played.

20. A system according to claim 13, wherein said means for recording further comprises:
   means for separating a received television program signal into an audio signal and a video signal;
   means for digitizing the audio signal into a digitized audio signal;
   means for digitizing the video signal into a digitized video signal;
   means for compressing the digitized audio signal into a compressed, digitized audio signal;
   means for compressing the digitized video signal into a compressed, digitized audio signal; and
   means for saving the compressed, digitized audio signal and the compressed, digitized video signal as one or more files on a hard disk.

21. A system according to claim 20, wherein said playing further comprises:
   means for obtaining the files associated with the selected television program from the hard disk;
   means for decompressing the compressed, digitized video signal into an uncompressed, digitized video signal;
   means for decompressing the compressed, digitized audio signal into an uncompressed, digitized audio signal;
   means for converting the uncompressed, digitized video signal into an analog video signal;
   means for converting the uncompressed, digitized audio signal into an analog audio signal;
   a video display screen for playing the analog video signal; and
   a speaker for playing the analog audio signal.

22. A system according to claim 13, wherein said means for recording further comprises:
   a tuner/video capture circuit for separating a received television program signal into an audio signal and a video signal, and for digitizing the video signal into a digitized video signal;
   a compression circuit for compressing the digitized video signal into a compressed, digitized video signal;
   a sound support circuit for digitizing the audio signal into a digitized audio signal, and for compressing the digitized audio signal into a compressed, digitized audio signal; and
   means for saving the compressed, digitized audio signal and the compressed, digitized video signal on a hard disk as one or more MPEG-2 files.

23. A system according to claim 22, wherein said means for receiving television program signals comprises an antenna connected to said tuner/video capture circuit.

24. A system according to claim 22, wherein said means for receiving television program signals comprises a cable connected to said tuner/video capture circuit.

25. A system according to claim 13, wherein said means for receiving television program signals comprises a satellite receiver, for receiving the television program signals from a satellite, wherein the television program signals include compressed, digital audio signals and compressed, digital video signals.

26. A system according to claim 13, further comprising:
   an alternate storage;
   means for receiving a save request from a third user to save a particular television program to said alternate storage; and
   means for saving the particular television program in said alternate storage.

27. A computer program product on computer-usable media, for use in recording and playing television programs for a plurality of users, comprising:
- means for creating a plurality of user profiles for the plurality of used wherein each user profile contains one or more recording options and one or more playback options for a corresponding user;
- means for creating a plurality of program schedules, wherein each program schedule contains data regarding one or more selected television programs to be recorded for a corresponding user;
- means for causing the selected television programs to be recorded as they air according to a corresponding user profile and, wherein the selected television programs are saved in a nonvolatile storage;
- means for displaying a play list, wherein the play list is displayed in response to a play request from a first user, and wherein the play list contains one or more available television programs that have been saved for the first user; and
- means for playing a selected one of the television programs that have been saved for the first user on the nonvolatile storage according to the first user profile.

28. A computer program product according to claim 27, further comprising:
- means for determining if playing the selected television program for the first user violates any of the playback options in a first user profile.

29. A computer program product according to claim 27, wherein said means for creating a plurality of program schedules further comprises:
- means for receiving a request from the first user to record a desired television program;
- means for determining if recording the desired television program for the first user violates any of the recording options in the first user profile; and
- means for adding data regarding the desired television program to the first user's program schedule.

30. A computer program product according to claim 27, wherein the user profiles are created in response to one or more requests from a master user.

31. A computer program product according to claim 27, wherein the recording options include a number of television hours that may be recorded within a designated time period.

32. A computer program product according to claim 27, wherein the recording options include a content restriction, wherein the content restriction determines a type of television program that may be recorded.

33. A computer program product according to claim 27, wherein the playback options include a playback time restriction, wherein the playback time restriction indicates a time period in which television programs may be played.

34. A computer program product according to claim 33, further comprising:
- means for receiving a play request from a second user; and
- means for determining if a current time is within the time period in which television programs may be played for the second user.

35. A computer program product according to claim 27, further comprising:
- means for receiving a save request from a third user to save a particular television program to a selected alternate storage; and
- means for saving the particular television program in the selected alternate storage.

36. A method according to claim 4, wherein the master user sets the recording and playback options for one or more of the user profiles.

37. A system according to claim 16, further comprising means for the master user to set the recording and playback options for one or more of the user profiles.

38. A computer program product according to claim 21, further comprising means for the master user to set the recording and playback options for one or more of the user profiles.

* * * * *

UNITED STATES PATENT AND TRADEMARK OFFICE
CERTIFICATE OF CORRECTION

PATENT NO. : 6,564,005 B1
DATED : May 13, 2003
INVENTOR(S) : Berstis

It is certified that error appears in the above-identified patent and that said Letters Patent is hereby corrected as shown below:

Column 13,
Line 37, please delete "or" and insert -- on --;

Column 15,
Line 5, please delete "used" and insert -- users --.

Signed and Sealed this

Twenty-second Day of July, 2003

JAMES E. ROGAN
*Director of the United States Patent and Trademark Office*